United States Patent [19]
Bitran

[11] 3,760,372
[45] Sept. 18, 1973

[54] ELECTRONIC COUNTING AND STORAGE SYSTEM HAVING NON-INTERFERING COUNTING STORAGE AND READ-OUT CAPABILITY

[75] Inventor: Munir Bitran, Ramat Aviv, Israel

[73] Assignee: Patelhold Patentverwertungs & Elektroholding AG, Glarus, Switzerland

[22] Filed: Dec. 8, 1971

[21] Appl. No.: 205,814

Related U.S. Application Data

[63] Continuation-in-part of Ser. No. 868,715, Oct. 23, 1969, abandoned.

[52] U.S. Cl. ...... 340/172.5, 307/221 R, 340/174 SR
[51] Int. Cl. ........................ G11c 19/00, H03k 23/10
[58] Field of Search .................. 340/172.5, 174 SR; 235/92; 307/220, 221 R, 223; 328/37

[56] References Cited

UNITED STATES PATENTS

| | | | |
|---|---|---|---|
| 2,997,233 | 8/1961 | Selmer | 235/92 |
| 3,017,627 | 1/1962 | Cour | 340/172.5 X |
| 3,214,573 | 10/1965 | Anderson et al. | 235/92 |
| 3,241,119 | 3/1966 | Rising et al. | 340/172.5 |
| 3,439,350 | 4/1969 | Smith | 340/174 SR |
| 3,500,339 | 3/1970 | White | 340/172.5 |

*Primary Examiner*—Paul J. Henon
*Assistant Examiner*—Melvin B. Chapnick
*Attorney*—Greene & Durr

[57] ABSTRACT

In an electronic counter in which each of the counting decades comprises a magnetic core shift register type ring counter enabling a non-destructive read-out, an electronic buffer register and a magnet core storage unit. The counter is operated periodically, via a control unit common to all decades, by auxiliary pulses having a repetition frequency being high compared with the means counting pulse frequency, to enable the control unit to effect a continuous read-out of the momentary counting state from the counter decades via the buffer registers to the associated storage units of the decades, without interfering with the normal counting operation.

11 Claims, 15 Drawing Figures

INVENTOR
MÜNIR BITRAN
BY
KARL RATH
ATTORNEY

FIG. 2a
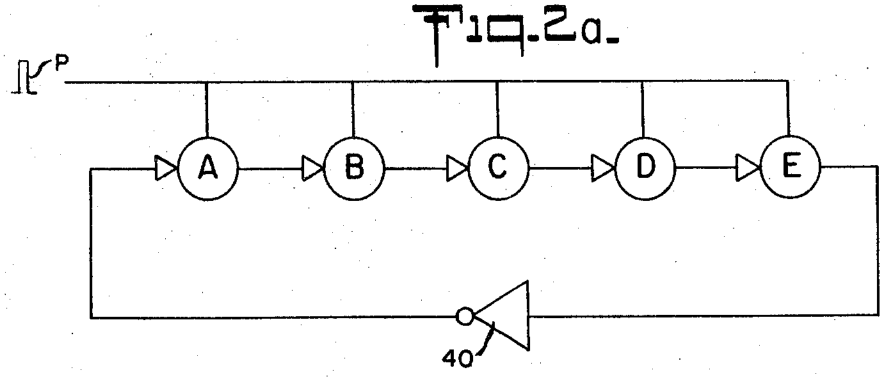
FIG. 2b
| | A | B | C | D | E |
|---|---|---|---|---|---|
| 0 | 0 | 0 | 0 | 0 | 0 |
| 1 | 1 | 0 | 0 | 0 | 0 |
| 2 | 1 | 1 | 0 | 0 | 0 |
| 3 | 1 | 1 | 1 | 0 | 0 |
| 4 | 1 | 1 | 1 | 1 | 0 |
| 5 | 1 | 1 | 1 | 1 | 1 |
| 6 | 0 | 1 | 1 | 1 | 1 |
| 7 | 0 | 0 | 1 | 1 | 1 |
| 8 | 0 | 0 | 0 | 1 | 1 |
| 9 | 0 | 0 | 0 | 0 | 1 |
FIG. 3
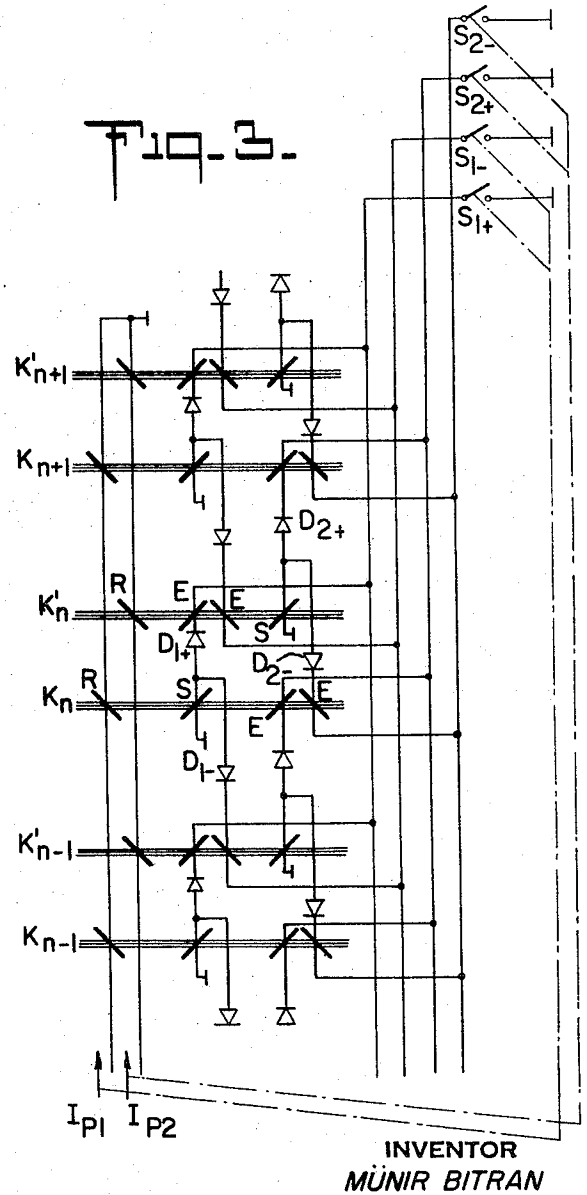
INVENTOR
MÜNIR BITRAN
BY
KARL RATH
ATTORNEY

INVENTOR
MÜNIR BITRAN
BY
KARL RATH
ATTORNEY

INVENTOR
MUNIR BITRAN
BY
KARL RATH
ATTORNEY

INVENTOR
MUNIR BITRAN
BY
KARL RATH
ATTORNEY

INVENTOR
MÜNIR BITRAN
BY
KARL RATH
ATTORNEY

ELECTRONIC COUNTING AND STORAGE SYSTEM HAVING NON-INTERFERING COUNTING STORAGE AND READ-OUT CAPABILITY

RELATED APPLICATIONS

This application is a continuation-in-part of application Ser. No. 868,715, filed Oct. 23, 1969, now abandoned.

BACKGROUND OF THE INVENTION

The present invention relates to an electronic counting and storage system, including switching and control means for the count-ing of input and decade carry pulses respectively, in both positive and negative directions, switching means for reading out and/or for storing the state of the counter at any instant without interruption of the normal counting operation, read-in storage devices having magnetic storage elements, and further means for the transfer of the coded information retained by said storage devices to output units for further processing.

Counting and storage systems embodying the forego-ing principles and composed of non-electronic construction elements, or operating on an electro-mechanical basis, have been in use for some time, in particular in conjunction with digital devices for telemetering apparatus. Numerous such arrangements have become known in conjunction with counting state stores under the name of "primary encoders."

The well-known disadvantages of electromagnetic devices, such as the high cost of components, large space requirements, contact contamination, supervision, etc., have made it desirable, in keeping with general present trends, to provide an electronic device which achieves the above objectives while avoiding the disadvantages of electromagnetic devices. Such a solution may start out by using conventional construction elements or circuits well-known in the art, such as counting chains, gate circuits, storage devices, etc. It should be pointed out, however, that a mere substitution of "corresponding" electronic elements or circuits for the electromagnetic elements of the known devices is not immediately feasible. In order to arrive at a practically useful solution, numerous difficulties must be overcome, it being sufficient to mention, for example, only the loss of the information caused by failures of the power supply. of Accordingly, an important object of the invention is to avoid the drawbacks of electro-mechanical systems and to provide a simple, economical and space-saving electronic counting and storage system of the referred to type which is capable of satisfying all the demands made on an electromechanical solution, and which system particularly solves the problem of information preservation without undue expenditure of parts.

SUMMARY OF THE INVENTION

With this general object in view, the invention involves generally the provision of a counting and storage system each decade of which comprises a ring counter composed of bistable magnet cores. The ring counter is designed to enable a non-descructive read-out of the state of the ring counter at any instant. A magnetic storage unit is provided for each decade and has a number of magnet core storage elements corresponding to the number of counter or switching stages in the associated ring counter. A buffer register composed of electronic flip-flop circuits is coordinated with the stages of the ring counter and of the corresponding storage elements of the magnetic storage units, respectively. Thus, the register can serve to temporarily store information and read-out either from said counter or said magnetic storage unit and for subsequent read-out and transfer of the information to the storage unit or the output units or circuits, resectively. In order to control the sequence of all these operations, there is provided a control unit common to all the decades. The control unit is operated or excited periodically by a pulse train having a high repetition rate in comparision with the frequency frequency the counting pulses. The control unit can receive a forward or backward counting input, and can also receive the signals generated at the occurence of output limit counting pulses in the individual decades at the occurrence of a counting pulse, the control unit causes a corresponding counting step to occur in the lowermost decade, or at the occurrence of a limit counting state signal in one of the decades (indicating that the capacity of that decade has been reached) accompanied by a counting pulse in the corresponding direction requiring a carry over to the next decade, causes the occurrence of a counting step in the corresponding direction in the next higher decade. In the absence of a counting pulse at both inputs of the lowermost decade, or in the absence of any carry over requirement in any of the higher decades the control unit acts to effect, in all the decades in which no counting step occurs, a non-destructive read-out of the momentary counting state of the ring counters, followed by a repeated storage of this counting state in the buffer register from which the information may be read-out, by the application of a storing order to the control unit, in non-destructive manner. The read-out from the buffer register is stored in the associated magnetic storage unit in which it will remain until the control unit, by the action of a read-out order applied thereto, excites a current pulse source causing an erasure of the information in all the magnet cores of the storage unit and restoring thereof in the buffer register previously cleared by a reset order. The restored information may then be transferred from the buffer register to the output units by means of the same read-out order and a decade selection signal which is directed to the appropriate decade of the counter.

By a switching system proposed by the invention, both the decade counter chains, as well as the storage units consist of magnet cores having a rectangular hysteresis loop, while the remainder of the system, in particular the buffer register, may consist of electronic construction elements, so that the advantage referred to above of an information preservation during failures of the power supply may be ensured under all circumstances, as will be shown by the following description and drawing.

The invention, both as to the foregoing and ancillary aspects as well as novel objects thereof, will be better understood from the following detailed description, taken in conjunction with the accompanying drawings forming part of this disclosure and in which:

BRIEF DESCRIPTION OF THE DRAWINGS

FIG. 2*a* shows the diagram of a known shift register type ring counter.

FIG. 2*b* is a table showing the coded information and shifting thereof in a counter of this type.

FIG. 3 shows the circuit diagram of an embodiment of such a shift register utilizing magnet core storage elements.

Like reference characters denote like parts or devices throughout the different views of the drawings.

DETAILED DESCRIPTION OF THE DRAWINGS

Figure 1:
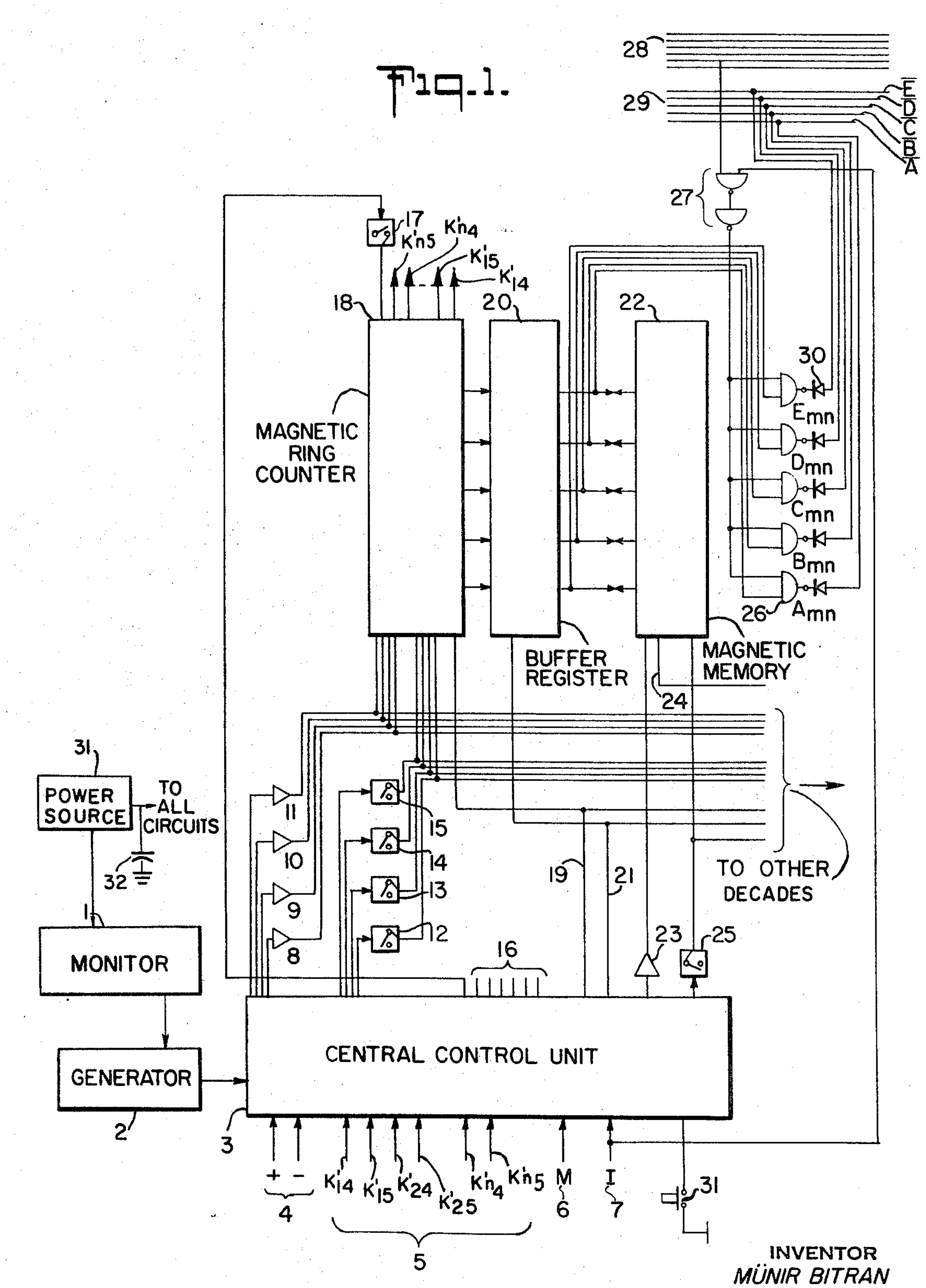
FIG. 1 is a general block diagram of a counting and storage system constructed in accordance with the principles of the invention.

Referring more particularly to FIG. 1, there is shown schematically the interconnection of the central control unit 3 with one typical decade of the system, additional decades having been omitted for purposes of simplicity. The decade per se consists of a ring counter 18 composed of magnet cores, a buffer register 20 composed of a corresponding number of electronic flip-flop circuits, a storage unit 22 also composed of magnet cores, and output circuits 26, 27, 30. Similar decades may be connected with each other in cascade, whereby the carry over pulse of any decade serves as input signal for the next higher decade. The operation of the system is periodic. Each pulse supplied by a generator 2 of an operating pulse series having a frequency being high compared with the recurrence frequency of the counting pulses, releases an operating cycle during the course of which the decades are excited successively and either change their counting state or — in the absence of a counting or carry over pulse — generate pulses enabling a transfer of the information from the magnet core register 18 into the buffer register 20. As will be further explained, an interruption of an operating cycle, as a result of a failure of the power supply, may result in falsification of the information contained in the amgnet core ring counter. For this reason, the pulse generator 2 is appropriately controlled by a current supply control monitoring device 1 which acts to block the pulses whenever the supply voltage of the voltage source 31 which energizes the system drops below a predetermined level. In order to cope with the possibility of the supply voltage disappearing completely during the course of an operating cycle, there may be provided between the current supply and the system, a buffer capacitor 32 adapted to supply the energy required for a complete operating cycle.

The system according to FIG. 1, operates as follows: An input counting pulse 4 is stored briefly in the control unit 3 until the beginning of the next following operating cycle. At the start of the cycle by a pulse supplied by the generator 2, the control unit excites the first decade, depending upon the existence of a counting pulse and the counting direction (+,−), and thereby decides, if necessary, on a carry over of this decade, stores the carry over of the decade, and advances the state of the decade and stores the new state in the associated magnetic storage units. In order to make a carry over decision, the control unit combines the signals 5, which show that the decade has assumed one of the two "limit counting states" (zero or nine) with the counting direction in this decade. If the decade is for instance in the "9" state and the counting direction is "forward" and the there results a positive carry over. It requires no further explanation that the rate or repetition frequency of the current pulse source 2, should be high compared with the mean or average counting pulse frequency, to prevent loss of counting pulses. Inasmuch as the time required for each decade is of the order of hundredths of a microsecond, a mean counting frequency of the order of a few kilocycles, in most cases much less, may be realized with a system of this type.

The control unit 3 at first selects, by means of an electronic switch 17, the decade and excites, depending on the previously received information (forward counting, backward counting or absence of a counting pulse), and in the manner described in detail hereafter, the constant current sources 8, 9, 10, 11 by means of three separate pulse sequences, act to release the following operations in the magnetic core counting ring 18 of the decades:

A. Forward counting

B. Backward counting

C. Non-destructive read-out in the absence of an input counting pulse (lowermost decade) or, in the absence of a carry over pulse (higher decade). This repeated read-out has the purpose of continuously maintaining the information in the buffer register at the most recent counter state.

During the last-mentioned operation C, pulses are generated in the magnetic core ring counter, which, as will be further explained in the following description, enable a take-over of the information of the ring counter, i.e., of the momentary counting state, by the buffer register 20. For this purpose, the register must first be cleared by the control unit 3, which occurs at the beginning of each operation cycle by means of a signal on line 21. Since the pulses generated in the ring counter 18 during forward and backward counting are such that they may falsify the contents of the buffer register, the control unit 3 acts to block these pulses by the aid of a blocking signal on line 19. As a consequence, a pulse to be counted appears at the output of the ring counter at the end of the next succeeding cycle, which however has no effect on the above-mentioned operations on account of the blocking described.

Receipt of a storage order (line 6) results in the control unit 3 blocking the reset signal from being applied to line 21 for the buffer register 20 and prevention of transfer of the information from the magnet core ring counter 18 to the buffer register by the aid of the signal on line 19. If the storage order (line 6) appears during an operating cycle, the control unit acts to delay the signal on line 19 until the end of the cycle, in order to prevent blocking of a portion of the carry-over pulses. As a consequence, the counter continues counting during the state of storage, while the buffer register 20, now separated from the ring counter, retains the counting state at the instant of storage. At this instant, the control unit 3 briefly closes the electronic switch 25 which has for its effect, as will be further explained in the following, the storage of the contents of the buffer register in the storage unit 22. During the entire interval between storage and issuance, or the taking out of the stored digital information for transfer and further processing, the information contained in the buffer register may be lost in part, or in whole, due to a failure of the current supply, or due to the effect of interfering signals to which electronic circuits are considerably more sensitive than magnetic cores. Nevertheless, this information is restored with the appearance of a read-out pulse by restoring of the contents of the magnetic storage unit 22 in the buffer register 20. For this purpose, the buffer register is at first cleared by the control unit 3 by means of a reset signal on line 21. Subsequently, the control unit excites the constant current pulse source 23 which latter source clears the cores of the magnetic core storage unit 22, whereby to induce pulses in the output windings of the latter, causing a re-writing of the stored information in the buffer register 20. In order to enable a subsequent repetition of the issuance, this operation is accompanied by the re-storing of the information of the buffer register in the storage unit 22, this being effected by a brief closing of the electronic switch 25 immediately following the issuance.

The read out of a stored counting state by the digital data processing system being served by the counter according to the invention, ordinarily occurs decade by decade. For this purpose, the central data system selects one of the described systems (which may be present in multiple form) by means of the issue input signal I (line 7) and a decade of this system by means of one of the decade-selecting signals applied to one of the line (28). Only for this decade, the output of the AND-circuit (27) generates a logical "1" output and the contents of the buffer register 20 of this decade appears in inverse form at the output of the AND-circuits (26), which are all enabled by gate 27. The diodes 30 are elements of the AND-circuits which serve to effect the grouping of the corresponding bits of the various decades. The signals representing the count of the decade appear on lines 29 which, in turn, are coupled to an output utilization device (not shown).

The magnetic core ring counter, also described in applicant's copending application entitled two core-one bit magnetic shift register with non-destructive read-out filed on Oct. 23, 1969 and identified by Ser. No. 868,856, now U.S. Pat. No. 3,594,739, is based on the principle of a binary shift register, the output of which is inverted and fed back to the input. This principle known under the name of "Mobiuscounter," is shown by FIGS. 2*a* and *b*, and enables a counting up to 2*n* in the case of *n* bistable switching circuits. The counter shown in FIG. 2*a* comprises 5 bistable switching stages designated by A,B,C,D,E and accordingly enabling counting from 0–9. The counting pulses P are simultaneously applied to all the counter stages and the state of the last stage E is fed back upon the first stage through a binary inverter 40. If it assumed that each counting stage includes means capable of assuming the state defined by an input signal at the instant preceding the occurrence of a shift pulse, that is, including means to store this state during a shifting operation.

Assuming that all the switching stages are initially in the binary state "0," the counting sequence will be as shown in FIG. 2*b*, wherein each stage assumes, during a shift, the state of the preceding stage prior to said shift, with the exception of the stage A receiving the inverse binary value of E existing prior to a shift. As can be seen, there may be realized in this manner 10 discrete states by the counting ring with the result of a return from the state 9 to the state 0. In order to count in the negative direction, all that is required, is to reverse the shifting direction.

In the magnetic core ring counter, each binary counting stage is composed of two cores each having a rectangular hysteresis loop. One of these cores forms the main element, while the other or auxiliary core serves to store the information during a shifting operation. In other words, each shift occurs in two phases, whereby during the first phase, the state of the main core is shifted to the auxiliary core and during the second phase, the state of the auxiliary core is shifted to the succeeding or preceding main core, respectively.

The special feature of the register utilized according to the present invention lies in the switching means for both forward and backward shift as well as in the utilization of two partial shifts, the effects of which in cancelling one another result in the generation of dynamic pulses suitable for detection and effecting a non-destructive parallel read-out.

FIG. 3 shows three stages of such a shift register, that is, comprising six cores altogether, or three main cores denoted by $K'_{n-1}$, $K'_n$, $K'_{n+1}$. Each core has four windings, viz., a shift winding R, and output winding S and two input windings E, as shown for the core $K'_n$. Only selected ones of said windings R, S and E have been labelled in FIG. 3 for purposes of simplicity. The shift windings R of the main cores K (i.e., unprimed cores) are connected to the current pulse source $I_{p1}$ which supplies an exciting pulse during a first switching phase, and the shift windings R′ of the auxiliary cores K′ (i.e., the primed cores) are connected to the current pulse source $I_{p2}$ which supplies an exciting pulse during a second switching phase. The output windings S of the main cores are connected via diodes $D_{1+}$ with the input windings of the succeeding intermediate cores K′, the resultant circuits being closed by the common electronic switch $S_{1+}$, and said output windings are furthermore connected via diodes $D_{1-}$ with the input windings of the preceding auxiliary cores K′, the resultant circuits being closed via the common electronic switch $S_{1-}$. Similarly, the output windings of the auxiliary cores K′ are connected in exactly the same manner via diodes $D_{2+}$ and $D_{2-}$ with the input windings of the succeeding and preceding main cores *k*, the resultant circuits being closed respectively, through the common electronic switches $S_{2+}$ and $S_{2-}$. It is to be noted that each thus formed coupling circuit consisting of an input winding, a diode and an output winding, may pass current only upon closing of the coordinated electronic switch, due regard being given to the current-passing direction of the diodes.

In explaining the operation of FIG. 3, it is assumed that all cores K′ are in the 0 state and that the cores K may be either in the 0 or 1 state, depending upon the binary information stored in the cores. Only the stage n will be considered, since the operation of the remaining stages is the same. During the first switching phase, a current pulse $I_{p1}$ is supplied and one of the switches $S_{1+}$ and $S_{1-}$ is closed. If the $K_n$ is in the 1 state, the exciting current causes a switching of this core to the 0 state, whereby to induce a voltage in its output winding. This voltage produces a current passing through the input winding of $K_n$, provided $S_{1+}$ is closed, or through the input winding of $K'_{n-1}$, if $S_{1-}$ is closed. This current causes a switching of the cores $K'_n$ or $K'_{n-1}$ to the 1 state. Simultaneously with this voltage in the output winding, voltages are induced in the input windings of the core $K_n$. These voltages cannot, however, produce a current, since the electronic switches $S_{2+}$ and $S_{2-}$ are open during the first switching phase and accordingly may not pass any current. If the core $K_n$ was in the 0 state, no voltage is induced in the output winding and the core $K_n$ is unable to influence an intermediate core. It will be seen, therefore, that the core $K_n$ is in the 0 state at the end of the first phase and that the binary information previously contained therein has been shifted to $K'_n$, if $S_{1+}$ is closed, Expressed otherwise, the effect is a partial shift, the direction of which can be selected by the aid of the electronic switches $S_{1+}$ and $S_{1-}$.

During the second switching phase, a current pulse $I_{p2}$ is supplied and one of the switches $S_{2+}$ or $S_{2-}$ closed, while $S_{1+}$ and $S_{1-}$remain open. The physical phenomena taking place are the same as before with the state of $K'_n$ being shifted to $K_{n+1}$ or back to $K_n$, involving thereby a second partial shift, the direction of which is determined respectively by the switches $S_{2+}$ and $S_{2-}$. From this it follows that two positive partial shifts result in a shift of the register by one step in the positive direction and that two negative partial shifts result in a shift of the register by one step in the negative direction, while one positive and one negative partial shift result in a total shift equal to zero accompanied by the generation of voltage pulses in the intermediate windings K' suitable for detection and effecting a read-out of the information stored in the cores K. In this manner, there is enabled the realization of the above-mentioned three-fold operating mode of the shift register (forward shift, backward shift, destruction-free parallel read-out).

Figure 4B:
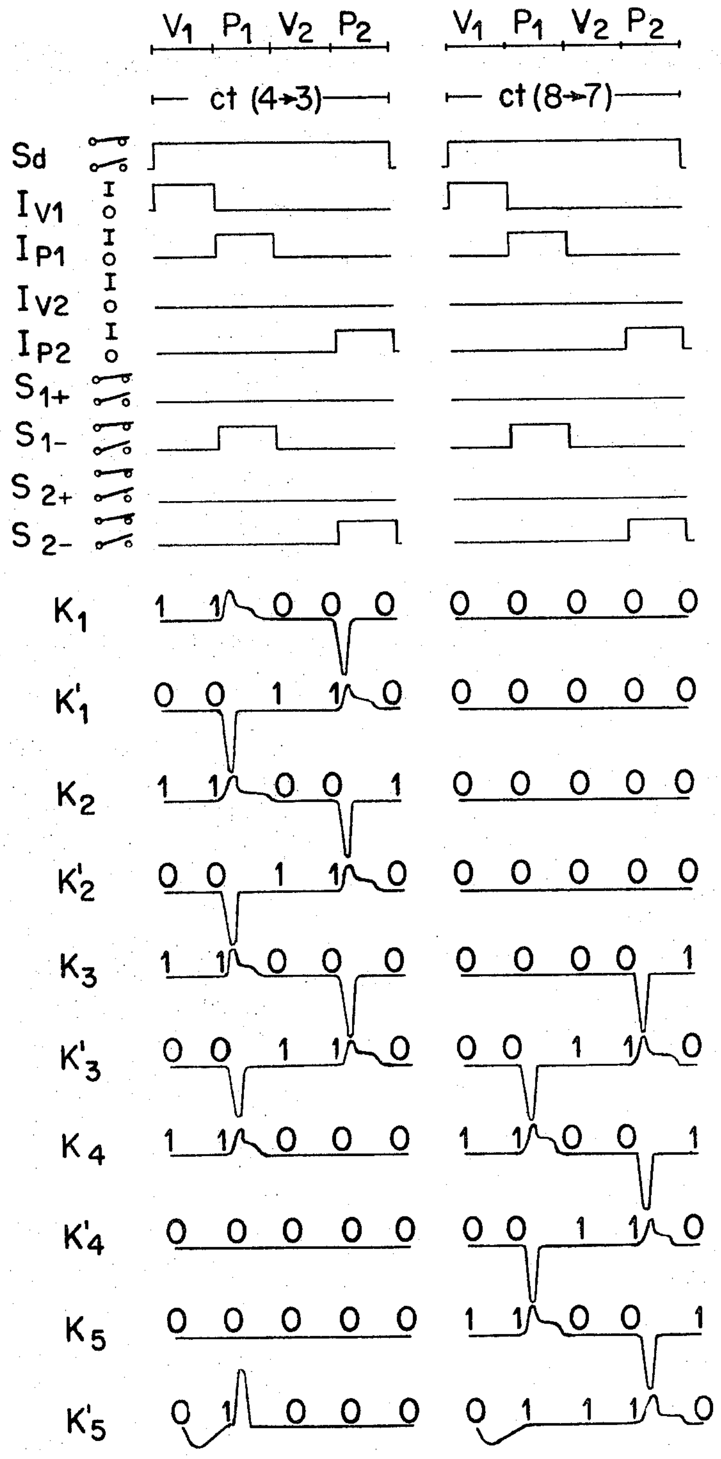
FIGS. 4*a* and 4*b* show a plurality of waveforms useful in describing the operation of the present invention.
Figure 4:
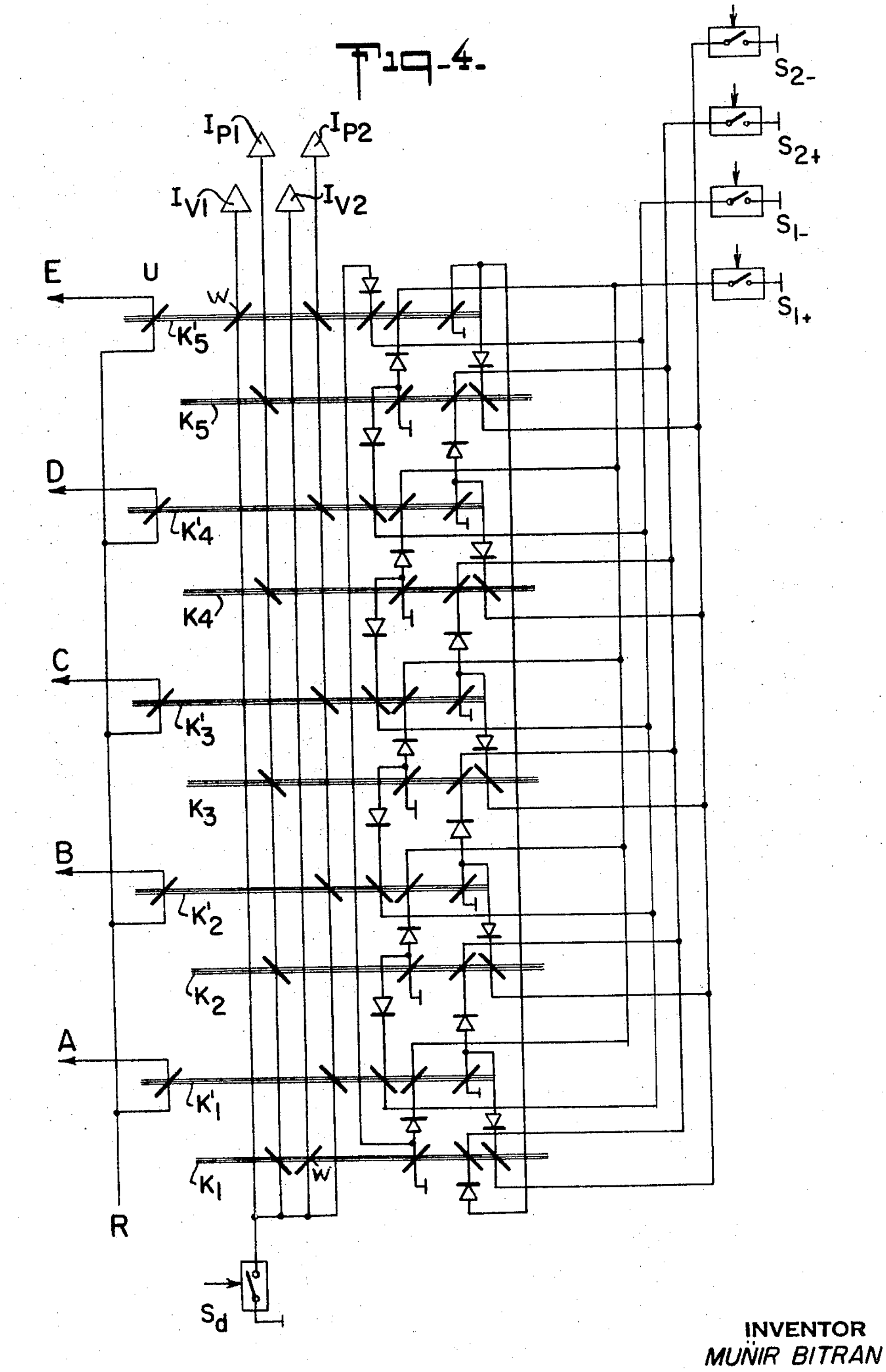
FIG. 4 shows the same register completed with switching means for the realization of the counting principle shown by FIG. 2*a*, with non-destructive read-out of the information.

FIG. 4 shows the wiring diagram of a decade of a counter combining the switching principles of the counting chain of FIG. *2a* described and of the magnetic core register, FIG. 3. The ring counter, like FIG. *2a*, comprises five stages, each of which has a main core $K_1$–$K_5$ and an intermediate core $K_{1'}$ –$K_{5'}$ , the windings of which cores are mutually interconnected in the manner shown by FIG. 3, except for the addition of the coupling circuits between $K'_5$ and $K_1$, of the current pulse sources $I_{Vl}$ and $I_{V2}$, and of the windings connected to these sources. These switching elements enable an inversion of the state of magnetization during the shift from $K'_5$ to $K_1$, and vice versa, in accordance with the operation of the "Mobius-Principle" illustrated in FIG. *2b*.

The realization of a reversal of the state of magnetization requires, in addition to the main switching phases $P_1$ and $P_2$, two preparatory switching phases $V_1$ and $V_2$, the sequence of effectiveness of all the phase being $V_1$-$P_1$-$V_2$-$P_2$. For forward counting, the current pulse source $I_{V2}$ supplies a current pulse during phase $V_2$, while the electronic switches $S_{1+}$, $S_{1-}$, $S_{2+}$, $S_{2-}$ are all open. For backward counting, the current pulse source $I_V1$ supplies a current pulse during phase $V_1$, while the same switches are open. During read-out nothing happens within the phases $V_1$ and $V_2$.

The process of inversion between the fifth and first stage during forward counting is as follows: During phase $P_1$, a pulse $I_{p1}$ is supplied, switch $S_{1+}$ is closed and the stage of $K_5$ is transferred to $K'_5$, in the manner described hereinabove. During phase $V_2$, current pulse $I_{V2}$ causes a change of $K_1$, which core has been switched to the state 0 under the influence of pulse $I_{p1}$, to the state 1. During the $P_{2-}$ interval, the intermediate core $K'_5$, assuming it to be in the 1 state, undergoes a change of state, whereby the voltage induced in its output winding produces a current via the input winding of $K_1$ and the switch $S_{2+}$, which — considering the winding sense of this input winding — has a result the return of this core to the 0 state. If $K'_5$ has already been in the 0 state, no voltage is induced thereby, whereby $K_1$ remains in the 1 state. The reversal during backward counting (between the first and the fifth stage) is similar, yet completed at the end of the $P_{1-}$ phase. During the $V_{1-}$ phase, the $I_{V1}$ pulse shifts the core $K'_5$ to the 1 state. During the $P_{1-}$ phase, there is produced in the output winding of $K_1$ a voltage, assuming the core to have been in the 1 stage, which voltage acts to return $K'_5$ to the 0 state; if however $K_1$ has been in the 0 state, $K'_5$ with remain in the 1 state. As a consequence, a reversal has been effected and the registered state corresponds to the state of $K_5$ during the $P_{2-}$ phase.

The pulse diagram shown by the coordinated FIGS. *4a* and *4b* illustrate the sequence of the exciting current pulses, of the switching conditions of the electronic switches, of the states of magnetization of the cores, and of the voltages induced in the windings of the cores during a read-out operation ("*lt*") and the various cases of counting positions ("*ct*"). As is understood, the interruption of these operations, due to a failure of the power supply, may result in a resumption at the beginning of the cycle — since the control unit consisting of semi-conductor logical circuits is unable to "remember" the interrupting point during the cycle — which may result in a destruction of the information in the counter. If an interruption of the cycle occurs during the transition from one to the next decade, the carry over signal may be lost, since it is stored in the control unit only. This makes it necessary to provide a buffer capacitor between the current supply and the system, the function of which has been explained hereinbefore.

The ring counter, shown by FIG. 4, further comprises, in addition to the switching circuits described, the electronic switch $S_d$ (see 17, FIG.1) by the aid of which the control unit selects the respective decade. This enables the common use of the current pulse $I_{V1}$, $I_{p1}$, $I_{V2}$, $I_{p2}$ and of the electronic switches $S_{1+}$, $S_{1-}$, $S_{2+}$, $S_{2-}$ for all of the decades. Since the shifting currents may flow only in the selected decade, the occurrence of inductive effects in the other decades — irrespective of the state of the switches $S_{1+}$, $S_{1-}$, $S_{2+}$, $S_{2-}$ is impossible, while, on the other hand, the voltages induced in the selected decade are unable, due to the current-passing directions of the diodes, to have any influence on the other decades via the bus lines connecting the switches. The decades, as indicated in FIG. 1, are connected in parallel, both in regard to the current sources as well as with the electronic switches.

As is understood, it is necessary for the attainment of a satisfactory operation of the magnetic ring counter to make sure that the cores at the start of a counting operation are in any one of the combination of states shown by FIG. *2b*. As a matter of fact, any other combination which may exist at the start, can no longer be corrected and will reappear cyclically, since the ring counter operates in a manner of a shift register. In order to avoid such a condition, there may be provided a push button enabling the production of cycles during which the electronic switches $S_{1+}$, $S_{1-}$, $S_{2+}$, $S_{2-}$, FIG. 3, remain open and the cores are returned to the 0 state without the pulses induced in their output windings being able to influence other cores. In this manner, the 0 combination, FIG. 2*b*, at the start of the device, may be set manually.

Figure 4A:
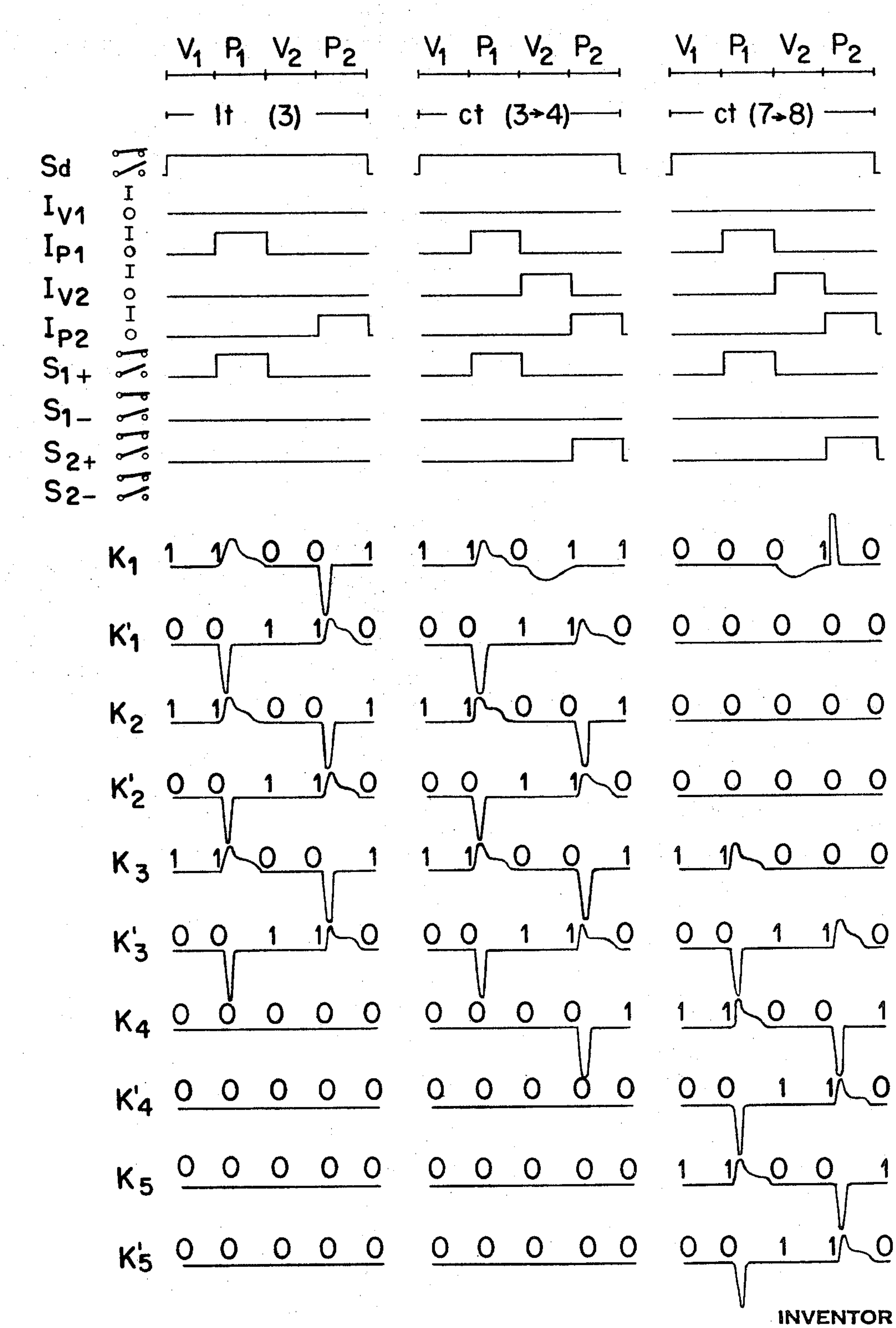

In order to enable a parallel read-out of the information in the magnetic ring counter, the intermediate cores K' are provided with output windings U, FIG. 4; each of these windings has one of its ends opposite to the output ends connected to a common reference voltage $V_R$, by means of which the information read-out from terminals A–E may be either rendered possible, or blocked. The voltages induced in these windings have a shape as shown in FIGS. 4*a*, and 4*b* ($K'_1$ to $K'_5$). As can be seen therefrom, the negative pulses represent the number contained in the ring counter, to be read-out in accordance with the code represented by FIG. 2*b*, which, however, is not always correct as far as the counting operation is concerned. For this reason, the information read-out is released solely during the read-out cycles ("*lt*"), FIGS. 4*a* and 4*b*.

Figures 5A, 5B:
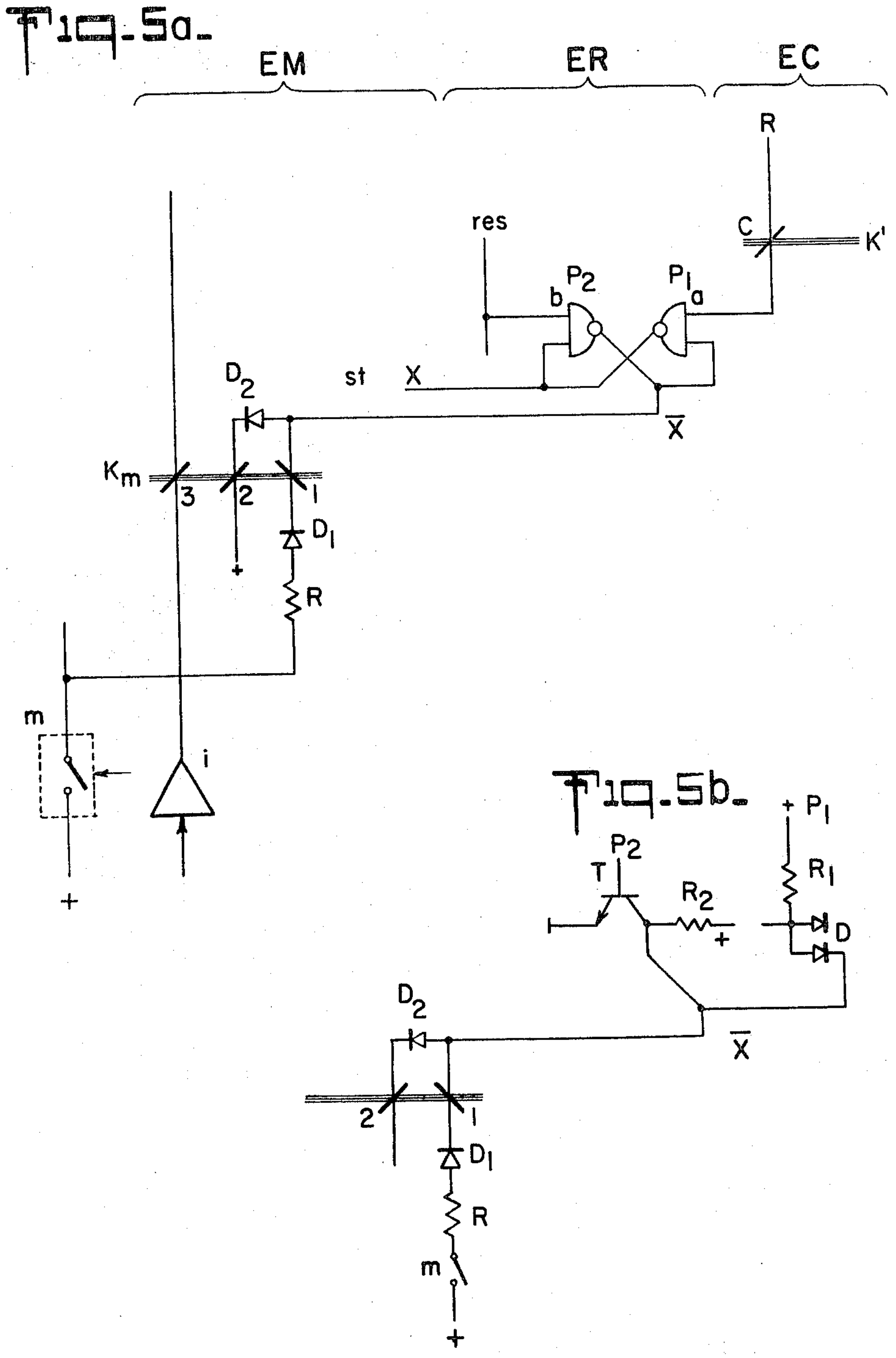
FIGS. 5*a* and 5*b* are circuit diagrams for the control of the information shift between the ring counter, the buffer register and the storage unit.

FIG. 5*a* shows the connection of such an output winding with the flip-flop of the buffer register and the connection of this flip-flop with a storage element of the magnetic storage unit 22. In the interest of clarity of illustration, the individual parts of the diagram are bracketed above the diagram, with additional reference characters EM (element of the magnetic storage unit), ER (element of the buffer register), and EC (element of the ring counter). Five completely identical circuits of the same type are provided for the five stages of each decade. The flip-flop consists in a known manner of two NAND-circuits, wherein the output of each of these circuits is connected with the input of the other circuit. An additional input of each NAND-circuit serves for the setting or resetting of the flip-flop. In this known circuit, the inputs "*a*" and "*b*" are normally at the logical 1 level. In order to switch the flip-flop to the state X=1, it is sufficient to apply a pulse to the input "a" extending to the logical 0 level, and in order to achieve an inverted state (X=0), it is sufficient to apply a like pulse to the input "*b*." Since use is made of a positive logic, the pulses used have a negative direction.

The transfer of the information from the ring counter 18 to the buffer register 20 functions as follows: during the preparatory phase $V_1$ (FIGS. 4*a* and 4*b*), a negative pulse is applied to the reset line "res," which is normally at the logical 1 level. This pulse resets all the flip-flops, which have not already been in the 0 state, to this state (X=0). During the read-out phase $P_1$, a negative pulse is induced in the winding U, provided the magnetic core element (intermediate core K') of the ring counter is in the 1 state, which pulse, in the case of the voltage upon the bus line $V_R$ (signal 19, FIG. 1) corresponding to the logical 1 level, switches the input "*a*" directly to the 0 level, which, in turn, results in a change-over of the flip-flop to the state X=1. When the element of the ring counter contains a binary 0, no voltage is induced in winding U (see FIG. 4) and the flip-flop remains in the state X=0. This shift of the information from the ring counter to the buffer register may be blocked under the abovementioned conditions and for the reasons pointed out, by increasing the voltage on line $V_R$ to a positive value exceeding the logical 1 level, that is, to such magnitude as to prevent the negative pulse induced in winding U for biasing the point "*a*" to the logical 0 level.

The magnetic storage unit 22 serves to take out the information from the buffer register 20 at the instant of storage and to return the information to the buffer register at the instant of interrogation or read-out, respectively. The electronic switch *m* and the current source *i*, which are common to all the cores and controlled by the control unit 3, serve to release the operations of storage and interrogation. The function thereof can be seen from FIGS. 5*a* and 5*b*; FIG. 5*b* is in part a repetition of the diagram of FIG. 5*a*, showing the output circuit of the NAND-circuit $P_2$ and the input circuit $P_1$, together with the connection with the storage element. In the absence of a storing order, the current source *i*, supplies periodic current pulses which make sure that the core $K_m$ at the instant of storage, is in the 0 stage. These pulses do not induce a voltage, since the core is normally in the 0 state. At the instant of storage, these pulses are blocked and the electronic switch *m* closed briefly; if X=1 or $\bar{X}$=0, the transistor T conducts, causing a current to flow through $R_3$, $D_1$ and the winding 1 and transistor T. This current causes the core to switch to the 1 state and to induce voltages in the winding 2 and 3, which, in view of the current passing direction of the diode $D_2$ and on account of the no-current state of the current pulse source *i*, remain without effect; if Z=0 and $\bar{X}$=1, the transistor T is blocked and the closing of switch m has no effect upon the core, whereby the latter remains in the 0 state. As a consequence, the information is transferred to the core, without, however, being erased in the flip-flop. Diode $D_1$ acts to decouple the $\bar{X}$ outputs of the various flip-flops.

At the instant of interrogation of the counting state, i.e., of its read-out for further transfer or utilization respectively, the flip-flop at first receives a reset pulse ("res," FIG. 5a) which switches the flip-flop to the 0 state. Subsequently the current source i supplies a pulse. If the core is in the 1-state, it is switched to the 0 state by change of the magnetization and a voltage is induced in the winding 2, bringing the point $\bar{X}$ to the logical 0-level.

As a consequence, the flip-flop switches the state X=1 and a voltage is induced in the winding *l* with a current flow being, however, prevented on account of th opening of the electronic switch *m* and the current passing direction of the decoupling diodes $D_1$ of the remaining elements.

If, however, the cores is in the 0 state, the current pulse supplied by *i* without influence and the flip-flop remains in the state X=0. As a consequence, the storage unit 22 is cleared and the information returned to the buffer register 20. From the output X ("*st*," *FIG. 5a*), the information may be transferred to the abovementioned output gates of the system.

FIGS. 6*a*–6*f* show an example of a realization of the control unit 3 as depicted in FIG. 1, for performing the functions described hereinabove. In the exemplary circuitry set forth hereinbelow, the sequential operation has been realized through the use of monostable circuitry without positive feedback, a typical circuit being shown in FIG. 6*a*. However, any circuits possessing positive feedback, such as flip-flops, have been avoided as much as possible, but this should not be deemed to exclude such circuitry. Circuits with positive feedback provide better immunity to noise and a better control of the event when the applied source fails, and/or returns. All of the figures, with the exception of FIG. 6*b*, refer to DTL-logic (i.e., diode-transistor logic).

The monostable circuit of FIG. 6*a* can be found in existing literature and its operation is as follows:

When the input terminal IN is at binary 0, $x = 1$ and $y = 0$, and the output OUT is 1. When IN goes to binary 1, $y$ goes to binary 1, but $x$ does not change immediately due to the delaying effect of capacitor C, so that OUT is at binary 0. When the capacitor has been sufficiently charged, $x$ goes to 0 and OUT goes to binary 1 thus terminating the output pulse. When the input returns to binary 0, $y$ goes to binary 0 and the output remains at binary 1. As can be seen from the foregoing, the circuit provides a negative going output pulse $P_{out}$ at every binary 0 to binary 1 transition of the input $P_{in}$, the length of $P_{out}$ being determined by the capacitance value of capacitor C.

Figures 6A, 6B, 6C:
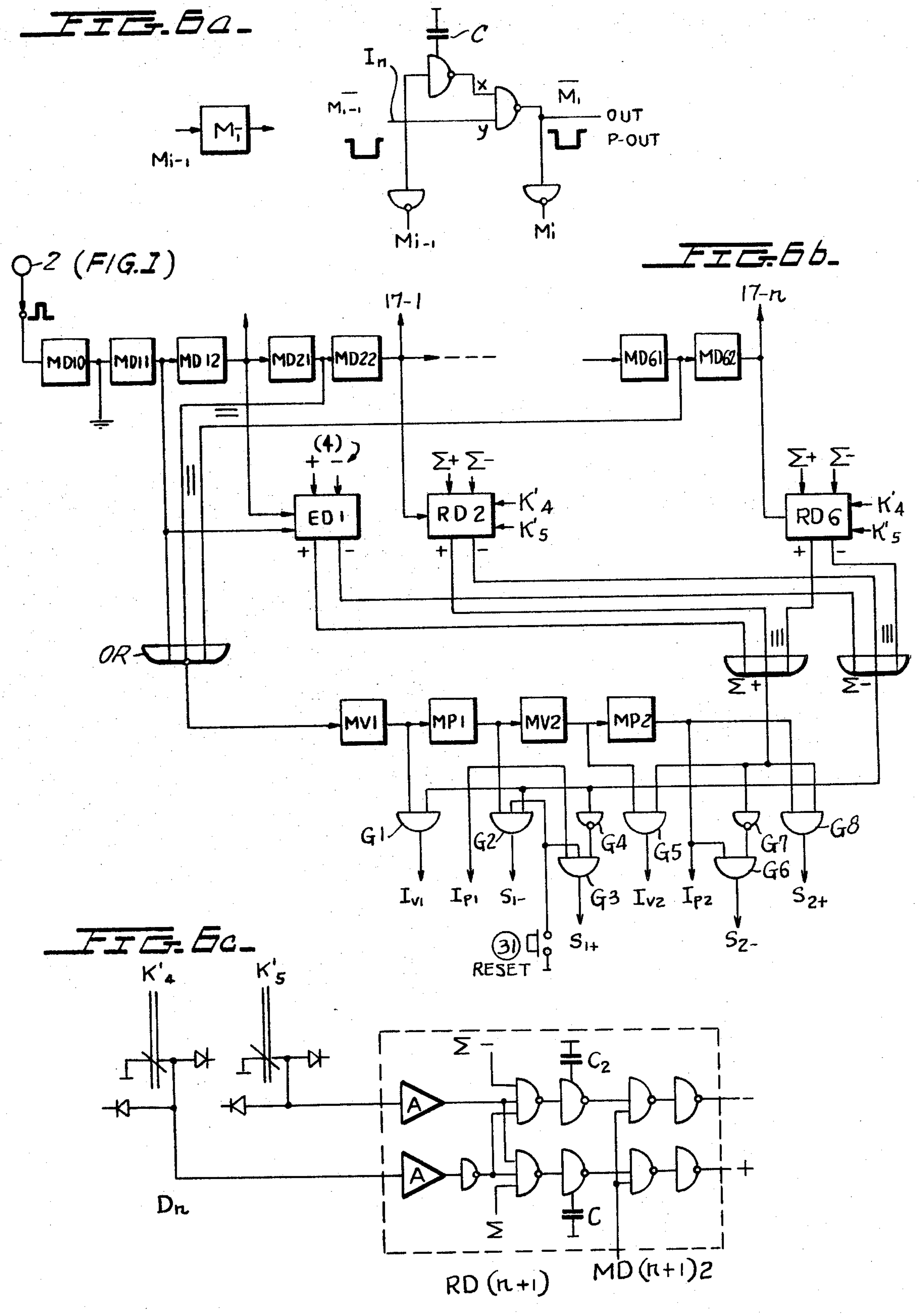
FIGS. 6*a* – 6*f* are logical diagrams and/or waveforms showing the portions of the control unit of FIG.1 in greater detail.

FIG. 6*b* shows that part of the control unit (3) which produces a counting sequence. A cycle starts with a pulse from generator 2 as shown in FIG. 1 which triggers the operation of a plurality of monostable multivibrators connected in tandem which includes three monostable stages for the first decade (denoted MD10, MD11 and MD12), with each of the remaining decades having two monostable stages (noted MDn1 and MDn2). The functions performed by MD10 will be set forth hereinbelow. Each monostable MDn1 triggers a second cascade of monostables MV1, MP1, MV2 and MP2, which produce a counting sequence for the ring counter of the *n*'th decade. Each monostable MDn2 provides a sufficient time interval for the counting sequence to be completed and further enables the circuits related to the associated decade to activate the decade switch 17 of its associated decade. Each of the monostables MDn1 is coupled to the first monostable $MV_1$ of the second group of cascaded monostables through an OR gate. In this manner, the decades are activated one after the other and a counting cycle is provided for each decade in sequence. It should be noted that the first set of cascaded monostables MD10–MD62 constitute a form of a delay line and obviously, any other delay line technique may be substituted therefor. This is likewise true of the second cascaded group of monostables, $MV_1$ through $MP_2$.

Input circuit EDI receives the counting pulse information (note terminals 4 — FIG. 1) which indicates the requirement for either an up $(_+)$ or down$(_-)$ pulse. The circuit EDI determines whether the count in the first decade will be a positive count or a negative count, or a non-destructive read-out. During the count in the first decade or the following decades, say decade *n*, a circuit RD(*n*+1) detects a carry or borrow from decade n and will accordingly control the count in decade (*n*+1). The outputs of these circuits are enabled by the associated monostables $MD(m_+1)2$ and the homologue outputs (carry output and borrow outputs) are tied together in two separate groups by means of separate OR gates whose outputs, Σ+ and Σ−, together with the outputs of the cascaded monostable stages MVl through MP2, are combined in a logic network comprising gates G1-G8, which serve to control a count, i.e., to operate the current sources $I_{v1}$, $I_{p1}$, $I_{v2}$, $I_{p2}$ and the switches $S_{1+}$, $S_{2-}$, (see FIG. 4 and the timing diagrams of FIGS. 4*a* and 4*b*). the sequence of operation of these elements in the three possible cases (up-count, down-count, NDRO) are clearly set forth in the timing diagrams of FIGS. 4*a* and 4*b*. The reset push button 31 (note also FIG. 1) makes it possible to inhibit the $S_{1-}$and $S_{1+}$switches, which enables the cores K to be reset without transmitting their content to cores K', since the push button cannot be activated for a shorter time than a full cycle, reset of all decades is thereby assured.

As was set forth hereinabove, each of the groups of cascaded monostables can be considered as being a delay line whose structure and operation is well known in the art. The borrow and carry circuits are also well known in the art, as typified in the text "Arithmetic Operations and Digital Computers" by R. K. Richards, published by D. Van Nostrand Co., Inc. (Eighth Edition, printed February 1960). Chapter 7, Pages 193–208 is specifically directed to decimal counting employing binary techniques, and Page 205 specifically refers to the use of ring counters for performing such counting operations. Borrow and carry circuits are discussed in this chapter, as well as Chapter 4, Pages 81–135.

FIG. 6*c* shows a carry-borrow circuit RD in more detail than that shown in FIG. 6*b*. The circuit $RD_{(n+1)}$ is connected to the ring counter itself, and detects a pulse on the output winding of core K'5 with no simultaneous pulse on the output winding of core K'4. If this condition occurs during a NDRO (non-destructive read-out) process, this indicates that the contents of the counter is decimal 9. If this condition occurs during an up (+) or down (−) count, it means that the content respectively has been or will be decimal 9, and that respectively a carry or a borrow is necessary. The up or down counting is determined by the signals $\Sigma_+$ and $\Sigma_-$ (see FIG. 6*b*) and can be combined with the suitably amplified $K'_4$ or $K'_5$ signal to generate a carry or a borrow pulse which can be memorized in a capacitor $C_1$ or $C_2$ in order to control the sequence of the next decade. This memorization time is longer than the sum of the time intervals developed by MD(*n*+1) 1 and MD(*n*+1) 2, but shorter than the overall cycle.

Figure 6D:
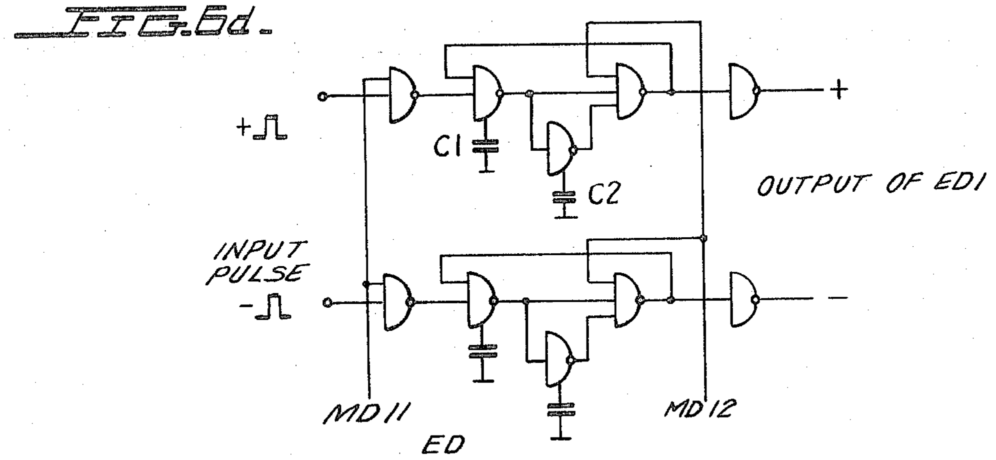
Figure 6E:
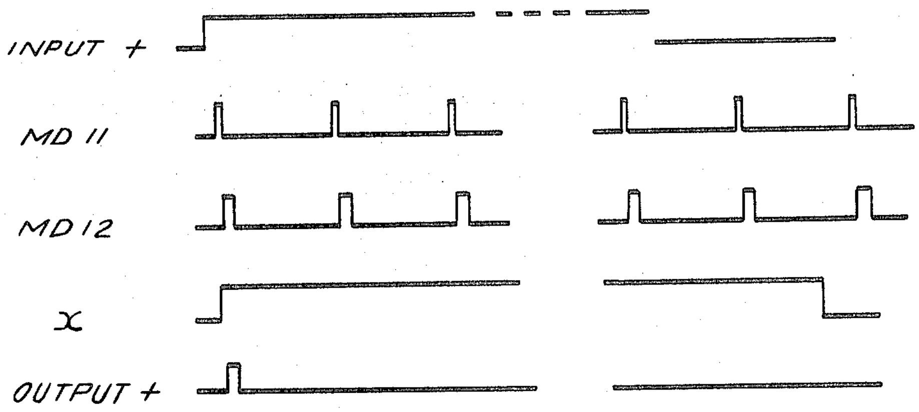

FIG. 6*d* shows the EDI circuit in somewhat greater detail than that shown in FIG. 6*a*, with the timing diagrams therefor being shown in FIG. 6*e*. In the application for the described system, up and down pulses are mutually exclusive and they cannot be generated within the same interval. An applied input pulse will be active only when the pulse from MD11 is present. At this moment, capacitor $C_1$ is discharged and terminal $x$ goes to binary ONE so that the following monostable generates an output pulse. This pulse will normally be longer than MD12, but is acutally gated by this signal so that the output is active only for the first decade, as desired. During this output pulse, the discharge of capacitor $C_1$ — which might not be complete if the input pulse occurs simultaneously with MD11 — will be completed. The same capacitor will then be repeatedly discharged at every MD11 pulse so that $x$ remains at binary ONE and the monostable develops no more output pulses so long as the input level remains at binary ONE. In this way, every input pulse is active during only one cycle of the first decade, and produces an up or down count of one unit.

Figure 6F:
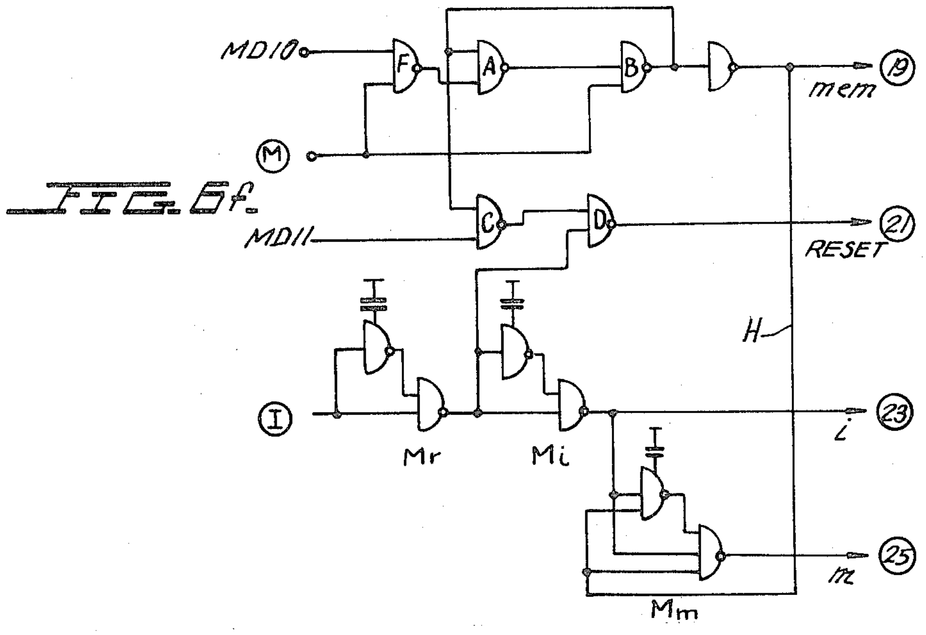

FIG. 6*f* shows that part of the control unit which generates the storage (MEM — FIG. 1, element 19) and reset (FIG. 1, element 21) signals for the buffer register and the read (*i*-FIG. 1, element 23) and write (*m*-FIG. 1, element 25) signals for the magnetic store operation. The first part of the circuit insures that a storage order M (FIG. 1, element 6) will not be effected before a pulse from MD10 occurs, i.e., at the very beginning of its cycle. In this way, the interruption of the transfer of information between the ring counter an ht buffer is avoided during a cycle which would otherwise leave part of the buffer up to date, and part of it in a previous state. To this effect, the NAND gates A and B are connected as a flip-flop circuit which is reset when M is at binary ZERO but which will be set only when M and MD10 are both at binary ONE. The reset pulses for the buffer register are given by MD11 at the beginning of every cycle. However, as soon as the storage order is effective, these pulses will be inhibited by gate C. The inhibit operation begins before the pulse, since MD10 occurs before MD11. As soon as the storage order is effective, monostable $M_m$ will be activated, and a write pulse will be given whereby the content of the buffer is written or transferred into the magnetic store.

The interrogation signal I (FIG. 1, element 7) activates a cascade of three monostables $M_r$, $M_t$ and $M_m$. $M_r$ produces a reset pulse (gate D) thus resetting the buffer, $M_t$ produces a read-out out of the magnetic store, thus transferring its content to the buffer and $M_m$ produces a write pulse causing the transfer of the contents of the buffer to the core storage. As these pulses are short compared to the time allowed for retrieval of the information, they cannot effect it.

Summarizing the operation of the control unit;

Pulse generator 2 applies a pulse to the input of MD10 (see FIG. 6*b*). After a predetermined delay determined by capacitor C (see FIG. 6*a*), a pulse is developed by the output of MD10. This pulse is simultaneously applied to the input of MD11 (FIG. 6*b*) and to one input of gate F (FIG. 6*f*). In the presence of a storage order M, gate F sets the flip-flop comprised of NAND gates A and B to develop a store order at the very beginning of the cycle. This causes monostable $M_m$ to be activated through lead H to develop a write pulse "*m*" whereby the content of the buffer 20 is transferred to magnetic store 22 through closure of electronic switch *m* (see FIGS. 5*a* and 5*b*).

With the flip-flop comprised of NAND gates A and B in the set state, gate C is inhibited, so that upon the occurrence of an output pulse from MD11, no reset pulse will be generated.

After a predetermined delay, MD11 generates an output pulse which is simultaneously applied to MD12, gate OR and ED1. The occurrence of an "up" pulse (see FIG. 6d) together with MD11 causes $C_1$ to discharge, whereby the development of the output pulse of MD12 gates a "+" or up count.

The output of the OR gate causes the gates MV1–MP1–MV2 MP2 to sequentially develop output pulses. Gate $G_1$ is disabled since the output Σ− is not present; signals $I_{p1}$ and $S_{1+}$are present when MP1 generates an output; gate $G_2$ is disabled since signal Σ− is not present; signal $I_{v2}$ is present when MV2 develops an output; signals $I_{p2}$ and $S_2$ are present when $MP_1$ develops an output, with gate $G_6$ being inhibited due to the presence of the Σ+ signal which is inverted by gate $G_7$. In the case of a "down" or "−" count, gate $G_1$ is enabled during MV1 time; gate $G_2$ is enabled during MP1 time (gate $G_3$ being inhibited); gate $G_6$ is enabled during MP2 time (gates $G_5$ and $G_8$ being inhibited).

MD12, when active, selects the first decade and also activates MD21 to reinitiate the cycle for th next decade. MD21 causes substantially the same sequence of operations as MD11. MD22 activates RD2 which examines the output windings $K'_5$ and $K'_4$ to determine the need for a carry or borrow, and together with the presence of a Σ+ or Σ− signal, controls the need for an "up" or "down" count for the appropriate decade.

The cycle is repeated for each succeeding decade in a similar fashion.

It can be seen from the foregoing description that the logic functions described hereinabove are provided for establishing the appropriate timing of pulses, the occurrences of which are clearly set forth in FIGS. 4*a* and 4*b*.

In the foregoing, the invention has been described in reference to a specific illustrative or exemplary device or system. It will be evident, however, that variations and modifications, as well as substitutions of equivalent parts and devices may be made without departing from the broader spirit and purview of the invention.

I claim:

1. An electric counting and storage system comprising in combination:

1. a counter having a plurality of decade stages for the counting of a series of electric input pulses applied to the five lowermost decade stages, and counting by the remaining stages of the carry-over pulses of the respective preceding stages, each of said decade stages including
   a. a shift register-type ring counter (18) composed of bistable magnetic core counting elements embodying means to effect a non-destructive read-out of the counting state of said ring counter at any given instant,
   b. a storage unit (22) having a plurality of magnetic storage elements corresponding to the number of counting elements of said ring counter,
   c. a buffer register (20) composed of electronic flip-flop circuits, each operably connected with associated ones of the counting and storage elements, to enable a temporary storage of the contents of said counter, read-out from said counter via said register, into said storage unit and a subsequent read-out therefrom into a utilization circuit (26, 27, 30) via said register:
2. a control unit (3) common to all said counting stages and a control source (2) to operate said control unit intermittently by an operating pulse series having a pulse recurrence frequency being high compared with the highest counting pulse frequency, said control unit including
   a. means to receive, at a counting input (4), said input pulses and to receive, at auxiliary inputs (5), the carry-over pulses from said decades,
   b. further means (16, 17) to release at the occurrence of an input pulse, a corresponding counting step in the lowermost decade stage and to release, at the occurence of carry-over pulses, corresponding counting steps in the remaining decade stages,
3. means to effect, upon the application of a storage signal (6) to said control unit and during the intervals respectively between counting input pulses in the lowermost decade stage, and between carry-over input pulses in any of the remaining decade stages, a read-out of the momentary counting states of the respective counters followed by a temporary storage thereof in the associated buffer registers and transfer to the associated storage units, and 4. means to erase, upon the application of a read-out signal (7) to said control unit, the formation in said storage units, and to retransfer the same to said buffer register, previously cleared by a reset signal (21) of said control unit, for final transfer to said utilization circuit 2. An electronic counting and storage system as claimed in claim 1, wherein said counter embodies means for enabling a logical inversion of the information between the last and the first, as well as between the first and the last counter stage, whereby n counting stages enables the realization of $2n$ counting states wherein $n$ is an integer.

3. An electronic counting and storage system as claimed in claim 1, wherein said counter comprises a chain of main cores (K) and auxiliary cores (K′) disposed between said main cores, wherein each of said main cores has an exciting winding (R), an output winding (S), and two input windings (E), wherein the exciting windings of said main cores, and of the auxiliary cores, are connected with each other and excited during alternate ones of first and second switching phases ($P_1$, $P_2$) by corresponding current pulse sources ($I_{p1}$, $I_{p2}$), wherein the output windings of the main cores are connected via diodes ($D_{1+}$, $D_{1-}$), each with an input winding of the succeeding and preceding auxiliary cores, and wherein the resultant circuits include electronic switches common to all auxiliary cores and decades ($S_{1+}$, $S_{1-}$), wherein similarly, the output windings of the auxiliary cores are connected, via diodes ($D_{2+}$, $D_{2-}$), and either of the input windings of the succeeding or preceding main cores, with electronic switches ($S_{2+}$, $S_{2-}$) common to all auxiliary cores and decades, and wherein with the application of the exciting current pulses from said current pulse sources ($I_{p1}$, $I_{p2}$) and by closing of the proper electronic switches during said switching phases, there results repsectively a forward and backward shift of the information by one step composed of two partial steps, or there results, in the case of opposite directions of the partial steps, a restoration of the information with simultaneous generation of electrical signals suitable for effecting a non-destructive read-out.

4. An electronic counting and storage system as claimed in claim 3, wherein the first main core ($K_1$) and the auxiliary core ($K'_5$) following the last main core ($K_5$) of said counter, each have an additional exciting winding (W) which windings receive, during two further switching phases ($V_1$, $V_2$) interposed between said first and second main switching phases ($P_1$ and $P_2$), exciting current pulses, wherein the winding sense of the input winding of said first main core connected with the output winding of said auxiliary core following the last main core, as well as the winding sense of the input winding of the said auxiliary core ($K'_5$) connected with the output winding of said first main core, is reversed relative to the winding sense of the corresponding windings of the other 5. An electronic counting and storage system as claimed in claim 4, including means having a manually operable push button (31) enabling a control of said control unit and the generation of operating cycles during which the electronic switches serving for the shifting and read-out of the information remain open, to return the cores to the 0 state without enabling the pulses induced in the output windings of the cores to influence other cores.

6. An electronic counting and storage system as claimed in claim 1, including a power source for powering the system having a monitoring device (1) serving to block the operating pulse series supplied by said control source (2) whenever the supply voltage of said power source decreases below a predetermined limit.

7. An electronic counting and storage system as claimed in claim 1, including a power source for powering the system, a buffer capacitor disposed between the power source and said system and adapted to supply the energy required for a full operating cycle, whereby with sudden failure of the power source during an operating cycle, the latter may be completed without loss of the information stored.

8. An electronic counting and storage system as claimed in claim 1, wherein the information in the buffer register (20) is erased at the beginning of each operating cycle by a reset signal (21).

9. An electronic counting and storage system as claimed in claim 8 wherein the pulses generated in the ring counter (18) during forward and backward counting are blocked by a blocking signal (19) supplied by the control unit, so as not to be able to enter the buffer register (20).

10. An electronic counting and storage system according to claim 8, wherein the control unit includes means for blocking, at the receipt of a storing signal (6), a reset signal (21) for the buffer register (20), to prevent a transfer of the information by the blocking signal (19) from the ring counter (18) into the buffer register (20).

11. An electronic counting and storage system according to claim 9, characterized in that, with the occurrence of a storing signal (6) during an operating cycle of the control unit (3), the control unit is provided with means for delaying the blocking signal (19) to the end of the cycle, to prevent blocking of some of the pulses being transferred.

* * * * *